United States Patent [19]

Nemetz et al.

[11] 4,023,586

[45] May 17, 1977

[54] ELECTRICAL CONTROL FOR HYDRAULICALLY-ACTUATED, MULTIPATH VALVES

[75] Inventors: Lothar Nemetz, Bad Oeynhausen; Klaus Nüsse, Leopoldshohe, both of Germany

[73] Assignee: Eisenwerk Weserhutte AG, Germany

[22] Filed: Aug. 12, 1975

[21] Appl. No.: 604,060

[30] Foreign Application Priority Data

Dec. 20, 1974 Germany .......................... 2460404

[52] U.S. Cl. ............................... 137/82; 137/614.2
[51] Int. Cl.² ........................................ G05D 16/20
[58] Field of Search .......... 137/82, 625.64, 625.61, 137/614.2; 251/129

[56] References Cited

UNITED STATES PATENTS

| 2,645,240 | 7/1953 | Drake | 137/82 X |
| 2,934,765 | 4/1960 | Carson | 137/625.61 |
| 3,410,308 | 11/1968 | Moog | 137/625.61 |
| 3,804,120 | 4/1974 | Garnett | 137/625.64 |

FOREIGN PATENTS OR APPLICATIONS 1,487,472  5/1966  France ........................... 137/625.64

*Primary Examiner*—Alan Cohan
*Attorney, Agent, or Firm*—James E. Bryan

[57] ABSTRACT

An electrically-controlled, hydraulically-actuated valve, having an inlet joined to a main outlet through a pressure regulating chamber; a by-pass passage joined to the pressure regulating chamber through a second enlarged chamber coaxial with the first; a valve seat formed at the juncture of the two chambers; a slidable valve, having one end tapered to seat in the valve seat and coaxially passing through the second chamber; a flow restricting viscosity non-influenced orifice in the inlet passage to form a jet of the introduced fluid; a blind hole extending into the body of the valve from the first chamber, directly opposite the discharge end of the inlet passage and coaxial therewith to avoid any jet stream impulse force on the tapered piston; a magnetizable core mounted on the other end of the valve; an annular electrical coil surrounding the core; and a biasing valve mounted in the discharge end of the by-pass passage and spring-biased against the flow of fluid.

1 Claim, 2 Drawing Figures

U.S. Patent  May 17, 1977  4,023,586
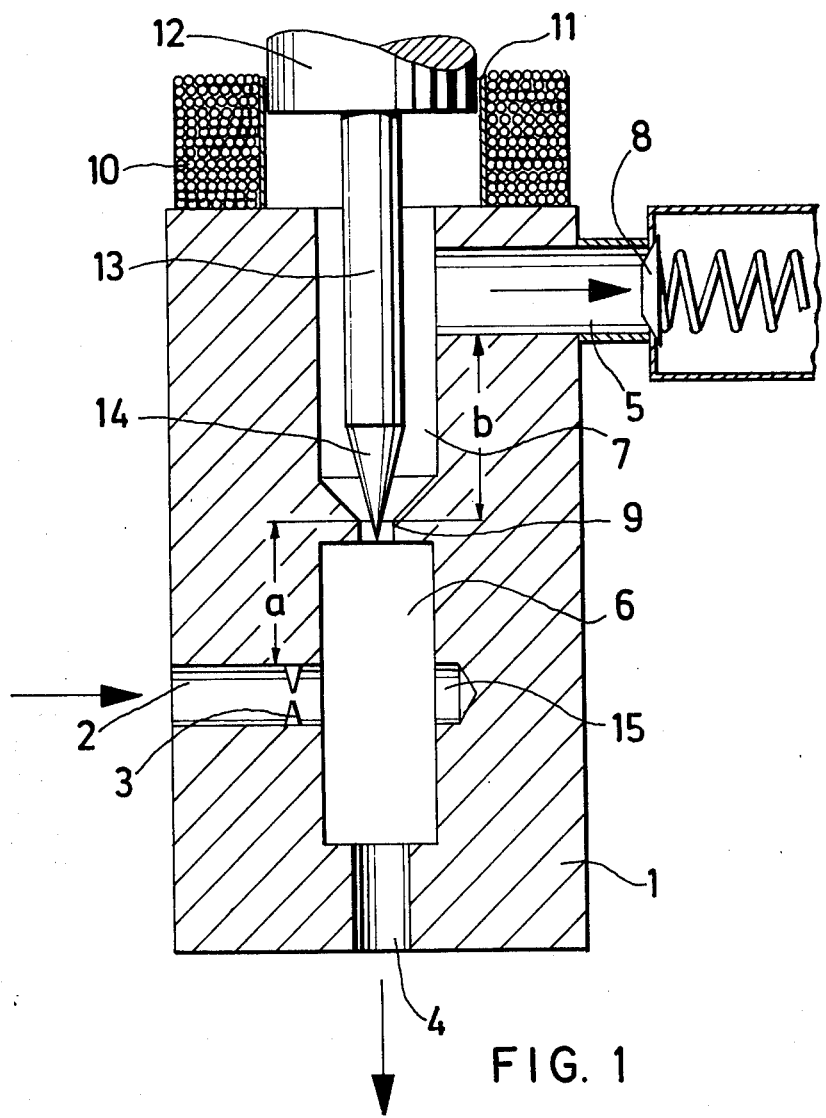

ELECTRICAL CONTROL FOR HYDRAULICALLY-ACTUATED, MULTIPATH VALVES

The present invention relates to an electrical control for hydraulically-actuated, multipath valves, wherein the control pressures, for actuation of the multipath valves, are adjusted continuously by means of control magnets mounted on or adjacent the electrically-actuated, three-way, pressure-regulating valves. The valves are designed as tapered-seat valves and the magnets act directly on the tapered control portion of the stem of the valves, thereby setting the control pressures.

The basic design of an electrical control for hydraulically-actuated, multipath valves is disclosed in German Application P 23 31 424.1-13.

If the behavior of the oil flow is neglected, there is the danger, in the conventionally designed, magnet-actuated, tapered-seat valves, that the tapered portion of the valve stem begins vibrating because of air entrained in the control oil, in the tank chamber behind the control guidance or seat edge and in the pressure regulation chamber ahead of the guidance or seat edge. In addition, because of the asymmetrical loading of the tapered control portion of the valve stem, by the control oil draining into the tank, such vibrations are then transmitted through the multipath valve to the operational oil stream and hence to the apparatus utilizing the oil.

There is a particular tendency to vibrate in magnet-actuated, tapered-seat valves, due to the release of entrained air and to pulses radially imparted to the tapered control portion of the valve stem, if the control body or valve stem, forming one unit (consisting of iron core, tapered rods and control taper) and moved by the magnet, is guided solely by sliding the iron core through the sleeve of the coil or bobbin, and if there is also no additional guidance for the tapered rod.

However, taper-rod guidance is expensive. Therefore, it is frequently dispensed with.

If simple magnets are used, where the iron core and hence the entire control body or valve stem is guided only in the sleeve of the coil or bobbin, and the danger of vibrations in the hydraulic system becomes excessive, one suppresses the vibration tendency of the tapered control portion of the valve stem, as much as possible, by means of vibration damping devices. However, such a damping system, again, requires additional expenditures.

The concept, of the present invention, is to allow no, or only insignificant, vibrations, that is, such as cannot affect or be transmitted to the pressure of the operational oil stream, when using control magnets of simple design and no special guidance means for the tapered control portion of the valve stem and/or additional vibration dampers, over the entire operational range of the electromagnetically-actuated, tapered-seat valves.

This object is achieved, in accordance with the invention, by providing a viscosity-independent stop or throttle in the supply line upstream of the control pump, which ensures the constancy of the volume of oil supplied, and a biasing valve in the tank hook-up, which is spaced away from the guiding edge or valve seat, to maintain the pressure in the tank chamber behind the guiding edge or seat constant, at a value above the oil pressure in the tank, which pressure is determined by the overall system. This maintained pressure value prevents air release upstream and downstream of the guiding edge or valve seat. The feeding of the control oil to the pressure regulation chamber, upstream of the guiding edge or seat, is approximately normal to the axis of the tapered control portion of the valve stem and spaced a distance from said guiding edge or seat. The jet effect of the control oil flowing toward the pressure regulating chamber, caused by the stop or throttle, is reduced by a blind hole located in the wall of the pressure-regulating chamber opposite the supply channel and on the same axis as said channel. The channel, used to guide the control oil toward the user equipment and in a direction coaxial with the tapered control portion of the valve stem is mounted and connected to the pressure-regulating chamber opposite the guiding edge or seat of the valve.

Such a design of the three-way, pressure control valve suppresses air release from the control oil, both in the tank chamber downstream of the guiding edge or seat and in the pressure regulating chamber upstream of the guiding edge or seat, and prevents pulses from acting from the oil flow and radially onto the tapered control portion of the valve stem, that is, the control taper is loaded symmetrically with respect to its axis and, therefore, the cause of vibrations in the control (even when using simple magnets and no guidance of tapered rods and/or damping systems) is removed and, accordingly, vibration-free control of the operational pressure is achieved through the multipath valve.

One embodiment of the invention is shown in the drawings, without thereby implying limitation, wherein:

FIG. 1 is a cross-sectional view of the valve and control magnet of the present invention; and FIG. 2 is a partial cross-section along the line 2-2 of FIG. 1.

The valve and its magnet are shown in diagrammatic section. The valve body is designated by the numeral 1. The hookup or pressurized oil supply channel 2 from the control pump has mounted therein viscosity-independent stop or throttle 3. The discharge connection to the user equipment is 4 and the hook-up to the by-pass or holding tank is 5. The pressure regulating chamber is designated by the numeral 6 and the tank chamber by 7. The biasing valve 8 is mounted at the end of channel 5. The guiding edge or seat of the valve is 9 and the tapered control portion 14 of the valve is formed on the end of tapered rod or stem 13. The magnet coil is 10 and the magnet sleeve 11. The iron core 12 is attached to the other end of stem 13. The iron core, together with the stem 13 and the tapered portion 14, form a single structural unit. Blind hole 15 is precisely opposite supply channel 2, that is, it is coaxial therewith.

If the valve is closed, that is, when the magnet coil 10 is electrically energized, all of the control pressure is upstream of the line to the user equipment. If the electrical potential and, hence, the force of the magnet coil 10 is reduced, to a greater or lesser degree, the tapered portion 14 of the valve stem 13 will be correspondingly lifted by the oil pressure and control oil may drain through the tank chamber 7 into the holding tank, so that the control pressure upstream of the line to the user equipment will be correspondingly decreased.

The viscosity-independent biasing valve 8 ensures that the pressure in the tank chamber 7, and hence also in the pressure regulating chamber 6, will still be a given amount above that in the holding tank and will thus prevent entrained air from being released into the control oil.

The oil from the control pump, that is, the oil jet in contact with the viscosity-independent stop or throttle 3, is deflected or reversed in blind hole 15, so that the force of the jet is converted into pressurized oil, without entrained air thereby being released.

The design of the valve of the invention also prevents the occurrence of low-pressure areas, from injection effects, from which entrained air might be released.

The tank connection 5 and the pump connection 2 are each spaced a distance $b$ and $a$, respectively, from the guiding edge or seat 9, so that the oil jet and the discharge to the holding tank do not act on the tapered control portion 14 of the valve and radial impulses are excluded.

Accordingly, the present invention provides a vibrationfree, magnetically-actuated, multipath valve of simple and economical construction.

It will be obvious to those skilled in the art that many modifications may be made within the scope of the present invention without departing from the spirit thereof, and the invention includes all such modifications.

We claim:

1. An electrically-controlled, hydraulically-actuated, three-way, pressure-regulating valve comprising a housing, pressure regulating chamber means in said housing, main inlet means and main outlet means connected to said chamber means, said inlet means having a flow restricting viscosity non-influenced orifice means therein adapted to form a jet of introduced fluid, blind hole means in said housing directly opposite the discharge end of said inlet means and coaxial therewith, whereby jet stream impulses are eliminated, second chamber means in said housing coaxial with said pressure regulating chamber means, valve seat means at a juncture of the two chamber means, slidable valve means coaxially passing through said second chamber means and having one end tapered to seat in said valve seat means, magnetizable core means mounted on the other end of said valve means, electrical coil means mounted adjacent said core means, by-pass passage means connected to said second chamber means, pre-loaded valve means in said by-pass passage means, and said main inlet means and said by-pass passage means being positioned at a distance from said valve seat means.

* * * * *

UNITED STATES PATENT AND TRADEMARK OFFICE
CERTIFICATE OF CORRECTION

PATENT NO. : 4,023,586

DATED : May 17, 1977

INVENTOR(S) : Lothar Nemetz and Klaus Nüsse

It is certified that error appears in the above-identified patent and that said Letters Patent are hereby corrected as shown below:

Column 1, line 14, after "sures.", the following has been omitted:

— — — These control pressures always will be proportional to the control potentials applied to the magnets. Nozzles or throttles which, if desired, may be externally adjusted or are mounted interchangeably, furthermore maintain constant the pressure of the oil in the feed line. — — —

Signed and Sealed this thirtieth Day of August 1977

[SEAL]

Attest:

RUTH C. MASON
*Attesting Officer*

C. MARSHALL DANN
*Commissioner of Patents and Trademarks*